US012660932B1

(12) United States Patent
Youngblood et al.

(10) Patent No.: US 12,660,932 B1
(45) **Date of Patent: *Jun. 23, 2026**

(54) MULTI-ZONE TEMPERATURE MODULATION SYSTEM FOR BED OR BLANKET

(71) Applicant: Sleep Solutions Inc., Wilmington, DE (US)

(72) Inventors: Todd Youngblood, Mooresville, NC (US); Tara Youngblood, Mooresville, NC (US)

(73) Assignee: Sleep Solutions Inc., Wilmington, DE (US)

( * ) Notice: Subject to any disclaimer, the term of this patent is extended or adjusted under 35 U.S.C. 154(b) by 492 days.

This patent is subject to a terminal disclaimer.

(21) Appl. No.: 18/170,990

(22) Filed: Feb. 17, 2023

Related U.S. Application Data

(63) Continuation of application No. 17/736,657, filed on May 4, 2022, now Pat. No. 11,583,096, which is a continuation of application No. 17/500,498, filed on Oct. 13, 2021, now Pat. No. 11,324,330, which is a continuation of application No. 16/684,648, filed on (Continued)

(51) Int. Cl.

| | |
|---|---|
| ***A47C 21/04*** | (2006.01) |
| ***A47G 9/02*** | (2006.01) |
| ***F25B 21/04*** | (2006.01) |

(52) U.S. Cl.

CPC ............ *A47C 21/04* (2013.01); *A47G 9/0215* (2013.01); *F25B 21/04* (2013.01); *A47C 21/042* (2013.01); *A47C 21/044* (2013.01); *A47C 21/046* (2013.01); *A47C 21/048* (2013.01); *A61G 2203/46* (2013.01); *A61G 2210/70* (2013.01); *A61G 2210/90* (2013.01)

(58) Field of Classification Search

CPC .. A47G 9/0215; A47G 9/1036; A47C 21/042; A47C 21/044; A47C 21/046; A47C 21/048; A47C 21/04; A61G 2203/46; A61G 2210/90; A61G 2210/70; F25B 21/02; F25B 21/04; F24F 5/0042; A61M 2205/3673; A61M 2021/0066

USPC .................................................. 5/421; 63/3.2

See application file for complete search history.

(56) References Cited

U.S. PATENT DOCUMENTS

| | | | |
|---|---|---|---|
| 2,504,308 | A | 4/1950 | Donkle |
| 2,753,435 | A | 7/1956 | Ivar |

(Continued)

FOREIGN PATENT DOCUMENTS

| | | | |
|---|---|---|---|
| GB | 2101966 | | 1/1983 |
| GB | 2101966 | A | 1/1983 |

*Primary Examiner* — David R Hare

(74) *Attorney, Agent, or Firm* — Cozen O'Connor

(57) ABSTRACT

A temperature modulation system for a bed, blanket, or other furniture includes a fluid for moderating temperature change, a number of conduit circuits for directing the fluid through respective zones, a control unit including a thermoelectric device for modulating temperature of the fluid, and a pump. Each of the conduit circuits selectively and independently directs fluid through its respective zone in order to produce a temperature within the zone that is independent of the temperature outside the zone. The system also includes an arrangement of one or more zones in an arrangement in which the control unit is programmed to vary the zone temperature over time according to a schedule.

19 Claims, 6 Drawing Sheets

Related U.S. Application Data

Nov. 15, 2019, now Pat. No. 11,147,389, which is a continuation of application No. 15/961,134, filed on Apr. 24, 2018, now Pat. No. 10,477,978, which is a continuation of application No. 15/482,148, filed on Apr. 7, 2017, now Pat. No. 10,667,622, which is a continuation of application No. 12/203,241, filed on Sep. 3, 2008, now abandoned.

(60) Provisional application No. 61/084,995, filed on Jul. 30, 2008.

(56) References Cited

U.S. PATENT DOCUMENTS 3,154,926 A * 11/1964 Hirschhorn ............. F25B 21/04 165/172
3,648,469 A * 3/1972 Chapman ............... H10N 10/00 5/636
3,867,939 A 2/1975 Moore et al.
3,894,213 A * 7/1975 Agarwala ............ A47C 21/048 607/104
4,114,620 A 9/1978 Moore et al.
4,132,262 A 1/1979 Wibell
4,162,393 A 7/1979 Balboni
4,175,297 A 11/1979 Robbins et al.
4,659,905 A 4/1987 Gabrosek et al.
4,777,802 A 10/1988 Feher
4,982,466 A 1/1991 Higgins et al.
4,996,970 A * 3/1991 Legare ...................... A45F 3/04 126/210
5,033,136 A * 7/1991 Elkins .................. A47C 21/048 5/500
5,329,096 A 7/1994 Suematsu
5,448,788 A * 9/1995 Wu ...................... A47C 21/048 5/421
5,500,007 A 3/1996 Kim et al.
5,555,579 A 9/1996 Wu
5,568,659 A 10/1996 Fogel
5,577,278 A 11/1996 Barker et al.
5,586,347 A 12/1996 Frischknecht
5,594,962 A 1/1997 Bogdanoff
5,669,094 A 9/1997 Swanson
5,693,079 A 12/1997 Van Duren
5,697,963 A 12/1997 Augustine
5,701,621 A 12/1997 Landi et al.
5,800,480 A 9/1998 Augustine et al.
5,871,151 A 2/1999 Fiedrich
5,948,303 A 9/1999 Larson
6,006,524 A 12/1999 Park
6,163,907 A 12/2000 Larson
6,273,810 B1 8/2001 Rhodes, Jr. et al.
6,349,439 B1 * 2/2002 Cook ................. A61G 7/05776 5/713
6,539,725 B2 4/2003 Bell
6,557,353 B1 * 5/2003 Fusco ..................... F25B 21/02 62/3.5
6,581,224 B2 6/2003 Yoon
6,582,456 B1 6/2003 Hand et al.
6,606,754 B1 8/2003 Flick
6,768,086 B2 7/2004 Sullivan et al.
6,826,789 B1 12/2004 Choi
6,855,158 B2 2/2005 Stolpmann
6,859,967 B2 3/2005 Harrison et al.
6,871,365 B2 3/2005 Flick et al.
6,934,985 B2 8/2005 Sanders
6,945,987 B2 9/2005 Beard et al.
6,957,454 B1 10/2005 Newton
7,084,774 B2 8/2006 Martinez
7,111,465 B2 9/2006 Bell
7,165,281 B2 1/2007 Larssson et al.
7,176,419 B2 2/2007 Ellis et al.
7,226,471 B2 6/2007 Heaton et al.
7,231,681 B2 6/2007 Kasatshko et al.
7,331,184 B2 * 2/2008 Lee ......................... F25B 21/04 62/3.5
7,353,554 B2 4/2008 Wang
7,877,827 B2 * 2/2011 Marquette ............... F25B 21/02 5/652.2
8,324,533 B2 12/2012 Lee
8,732,874 B2 5/2014 Brykalski et al.
10,477,978 B1 * 11/2019 Youngblood .......... A47C 21/04
10,667,622 B1 6/2020 Youngblood et al.
10,813,468 B1 10/2020 Youngblood et al.
10,986,934 B1 4/2021 Youngblood et al.
11,147,389 B1 * 10/2021 Youngblood ........... F25B 21/02
11,324,330 B1 * 5/2022 Youngblood .......... A47C 21/04
11,583,096 B1 * 2/2023 Youngblood .......... A47C 7/748
2002/0124312 A1 9/2002 Yoon
2003/0019044 A1 1/2003 Larsson et al.
2003/0046762 A1 3/2003 Stolpmann et al.
2003/0061664 A1 4/2003 Salvatini et al.
2003/0135929 A1 7/2003 Dennison et al.
2003/0159219 A1 8/2003 Harrison et al.
2003/0208848 A1 11/2003 Flick et al.
2003/0234247 A1 12/2003 Stern
2004/0187216 A1 9/2004 Lin
2005/0278863 A1 12/2005 Bahash et al.
2006/0013703 A1 1/2006 Yokozawa et al.
2006/0048520 A1 3/2006 Huang et al.
2006/0053558 A1 3/2006 Ye
2007/0277313 A1 12/2007 Terech
2008/0085200 A1 4/2008 Michels et al.
2008/0127423 A1 6/2008 Gammons
2008/0141708 A1 6/2008 Obosu et al.
2009/0312823 A1 12/2009 Patience et al.
2010/0132124 A1 6/2010 Liu et al.
2010/0287701 A1 11/2010 Frias
2021/0219737 A1 * 7/2021 Youngblood ........ A61B 5/4809

* cited by examiner

MULTI-ZONE TEMPERATURE MODULATION SYSTEM FOR BED OR BLANKET

CROSS-REFERENCE TO RELATED APPLICATIONS

This application is a continuation of U.S. patent application Ser. No. 17/736,657, filed May 4, 2022, which is a continuation of U.S. patent application Ser. No. 17/500,498, filed Oct. 13, 2021 and issued as U.S. Pat. No. 11,324,330, which is a continuation of U.S. patent application Ser. No. 16/684,648, filed Nov. 15, 2019 and issued as U.S. Pat. No. 11,147,389, which is a continuation of U.S. patent application Ser. No. 15/961,134, filed Apr. 24, 2018 and issued as U.S. Pat. No. 10,477,978, which is a continuation of U.S. patent application Ser. No. 15/482,148, filed Apr. 7, 2017 and issued as U.S. Pat. No. 10,667,622, which is a continuation of U.S. patent application Ser. No. 12/203,241, filed Sep. 3, 2008, which claims the benefit of U.S. Provisional Patent Application No. 61/084,995, filed Jul. 30, 2008, each of which is incorporated herein by reference in its entirety.

FIELD OF THE INVENTION

The present invention relates generally to heating and cooling systems for bed mattresses, blankets, and other furniture, and more generally to a multi-zone temperature modulation system whereby each zone is able to be selectively and independently heated or cooled to a target temperature.

BACKGROUND OF THE INVENTION

It is desirable to control the temperature of a bed or other piece of furniture that supports a person, such as when sleeping. Such control has therapeutic value in treating symptoms of menopause or conditions of hypothermia or hyperthermia, particularly when those conditions manifest themselves over a long period of time. Therapeutic value is also seen for individuals who have circulatory disorders, sleep disorders, and other conditions that are improved by increasing the comfort felt during sleep. Such control is desirable even outside the therapeutic value of cooling or heating a mattress, simply to match the personal comfort preferences of healthy individuals, or to provide localized control when a more general control, such as heating or air conditioning of a sleeping space, is unavailable or when adjustments to the general control cause others discomfort or are inefficient from an energy consumption perspective.

Various methods of temperature control are known, including such classic systems as electric blankets or heating pads, as well as more recent developments that involve the circulation of a heated or cooled fluid through a mattress, such as directing air through the chambers of an air mattress or directing air or a fluid through a tube that is embedded within a mattress or a mattress topper. The more advanced of these systems utilize a heat source or sink (i.e., cooling source) to heat or cool a reservoir of fluid to a selected target temperature and pump the heated or cooled fluid through the available conduit, relying on principles of heat exchange to control the mattress temperature.

In connection with the known methods of accomplishing temperature control, there are various problems and deficiencies that render these known methods ineffective or less than fully effective at achieving temperature control under optimal conditions. For example, such systems, particularly those that are designed for cooling, are often fairly noisy, thereby interfering with the subject individual's ability to sleep and defeating many of the therapeutic aspects of such systems.

Of somewhat more universal importance, however, is the lack of specificity such systems have in controlling temperatures in various zones of coverage, when the user desires different temperatures in different zones. A user that desires a particular temperature for sleeping often shares his or her bed with another person who desires a different temperature for sleeping-a situation that sometimes leads to arguments, one user's lack of comfort, or a compromise that leaves neither partner happy. Another user desires, for example, a certain temperature for the majority of his or her body but a somewhat warmer temperature for his or her feet, or a somewhat cooler temperature for his or her head.

In order to satisfy the need for multiple zones, conventional systems have heretofore utilized multiple apparatuses to conduct zone-independent temperature modulations. In the situation where the bed is to be shared, each side of the bed is provided with its own independent temperature control apparatus. A similar arrangement is able to be used for different zones associated with a single user. However, conventional arrangements that require multiple independent systems require substantial duplication of the most expensive and potentially noisy parts of a conventional temperature control system—the circulation pump and the heating or cooling source.

Yet another issue with conventional single-zone systems is that they are not programmatically controllable over time. Although some systems provide for thermostatic control to prevent overheating or overcooling, some users desire, for example, a warmer temperature at bedtime and a cooler temperature later in the sleep cycle, or vice versa. These systems are even more deficient when the user wishes to coordinate varying temperatures in various zones with various stages of the sleep cycle in order to promote deeper and more satisfying sleep.

Although many of the applications of the present invention relate to sleep and beds, the invention is equally applicable to other types of support furniture, such as chairs, or to more portable systems, such as wheelchair cushions, blankets, or mattress toppers.

What is needed is a multi-zone temperature modulation system that enables selective and independent heating or cooling of specific zones using a single heating or cooling apparatus and pump to minimize the cost efficiency of manufacture, and that is programmatically controlled to vary the target temperature over time according to personal comfort or sleep cycle considerations.

SUMMARY OF THE INVENTION

In accordance with the aforementioned needs, the present invention includes a temperature modulation system for a bed that uses a fluid, such as a liquid or a gas, as the medium for temperature change at a surface of the bed. The fluid is directed through at least two conduit circuits that traverse respective independent zones, utilizing principles of heat exchange to heat or cool the bed surface. The invention employs a thermoelectric device to modulate the temperature of the fluid and a pump, such as a multichannel pump or a pump in combination with a multi-way valve, to pump the fluid through the conduit circuits. In this arrangement, each of the conduit circuits selectively and independently directs fluid through its respective zone to achieve a temperature of the mattress within the zone that is independent of the temperature of the mattress outside that zone.

In another feature of the present invention, a valve, which is mechanically or electrically operated, is able to be used selectively to direct fluid through the various conduit circuits at different rates to produce different levels of temperature change in different zones. Such an arrangement is flow-based, in which a given flow of fluid is divided among zones, or a time-division arrangement, in which the full flow of fluid is directed sequentially through the zones as needed to produce the target temperature of each.

In yet another feature of the invention, multiple components, such as pumps and valves, are utilized to achieve the appropriate temperature in each of multiple zones.

The system of the present invention is able to produce heating alone, cooling alone, or both heating and cooling, as the user requires.

In still another feature of the invention, the system is provided with one or more temperature sensors, which are configured to measure the temperature of the zone to provide feedback to a control mechanism in order to enable the system to reach the target temperature in each zone more efficiently.

The system of the present invention is able to be embedded within the mattress, or is portable, being embedded in a topper or blanket that is designed to be placed over the mattress.

The system is able to be conveniently controlled by remote control, and when the system is integrated with the mattress, the remote control is likewise integrated with other remotely controlled functions of the mattress, such as firmness control (for an air-based mattress), vibration control, and the like.

In another feature of the invention, the system is provided with a port connected to the constituent components (or to an internal control mechanism for those components) that enables the system to be connected to a computer for programmatic control of the operation of the system.

Alternatively, the present invention includes a multi-zone temperature modulation system for providing selective temperature change to a living subject. The system includes first and second independent zones, each of which has a conduit circuit for directing fluid through the zone in order to bring that zone's temperature to a target temperature. As above, a thermoelectric device selectively modulates the temperature of the fluids, at least one pump is used to pump the fluids through the conduit circuits. The fluid associated with one zone is isolated from fluid associated with the other zone, or those fluids are pooled. The system employs separate pumps for separate conduits, or it employs a single pump, aided by a multi-outlet valve or other valve types that permit separate flow to different circuits.

The present invention also alternatively includes a temperature modulation system for providing selective temperature change to a living subject on a time-based programmatic basis. As above, the system includes a fluid for moderating temperature change within a selected zone adjacent the subject, and a conduit circuit for directing the fluid through the selected zone according to a selected target temperature. A thermoelectric device handles the heating or cooling, and a pump is used to pump the fluid through the conduit circuit.

This alternative system also utilizes control means, such as a general-purpose or special-purpose computer that has been programmed, to control operation. The control means are programmed to control the zone temperature according to a schedule of target temperatures over a selected period of time.

Similar features to those described in connection with the embodiment described first above are able to be utilized in the alternative systems.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figure 1:
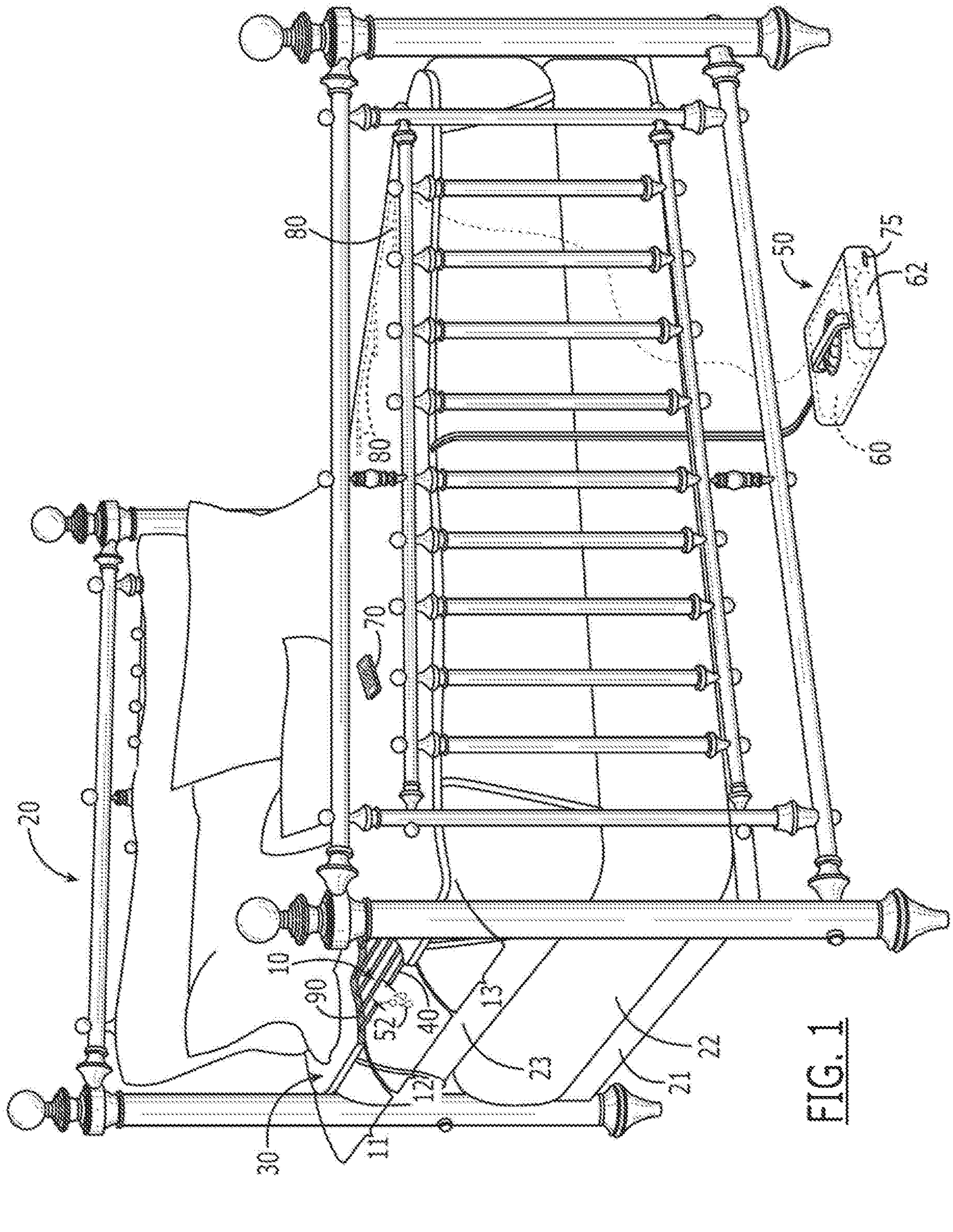
FIG. 1 is an environmental view of a preferred embodiment of the present invention.

Referring now to the drawings, FIG. 1 illustrates the general arrangement of a preferred embodiment of a multi-zone temperature modulation system 10 according to the present invention in an environmental perspective view. A bed 20 includes a support frame 21, a box spring foundation 22, and a mattress 23, all of conventional construction. In the depicted embodiment, the mattress 23 has been provided with a topper 30 that has embedded within it a multi-zone temperature modulation system 10 according to the present invention. Although the depicted embodiment illustrates a separate mattress topper 30, those skilled in the art will recognize that it is equally possible to combine the mattress 23 and topper 30 into a single piece, with the temperature modulation system 10 effectively being embedded in the mattress 23 itself. A separate mattress topper 30 holds some advantages over the combined construction because of the ability to use a separate topper 30 to retrofit an existing mattress 23.

The system 10 as depicted is divided generally into three temperature zones 11,12,13, which correspond generally to the position of a person's head and neck, trunk and legs, and feet when the person (not shown) lies on the mattress 23. The depicted system 10 is arranged to permit the three zones 11,12,13 to be targeted for three independent temperatures. As used herein, the term "independent temperature" refers to a zone temperature that is set or targeted without respect to the temperature of another zone; an independent temperature is able to be the same temperature as that of another zone, and there is no requirement that the temperatures be different.

Although the embodiment depicted in FIG. 1 shows multiple zones arranged for a single person's use, other multi-zone arrangements are possible, and will be discussed in greater detail below. The present invention is not limited to a particular number or arrangement of the zones; it is sufficient for the multi-zone aspect of this invention that there be more than one zone, regardless of the disposition of the zones.

In order to accomplish the temperature modulation of the zones 11,12,13, a set of conduit circuits 40, at least one per zone, is provided. These conduit circuits 40 are able to be formed of any suitable material, such as plastic or metal, or more preferably flexible silicone, selected with the principal consideration being the ability of the conduit circuit material to transmit heat to or from the topper 30. Depending on the configuration of the zone, it is sometimes preferred to have more than one conduit circuit 40 per zone, particularly in the case of a very large zone. The conduit circuit or circuits 40 repeatedly traverse the zone in a back-and-forth arrangement, in order to provide temperature modulation to the entire desired surface area of the zone. The conduit circuits 40 are arranged to return to their starting point to enable the return of fluid to the heating/cooling apparatus 50.

The heating/cooling apparatus 50 generally includes one or more reservoirs 60 for temperature modulation fluid 52, which is a liquid, such as water, or a gas. In a preferred embodiment shown, water is the fluid mediator for temperature modulation. The reservoir 60 is provided with a device 62 for heating or cooling the liquid 52 stored therein, such as a Peltier thermoelectric device. Such a device is generally well known and useful for its efficient movement of heat when a direct current is applied thereacross. The Peltier device 62 creates a heat source and a heat sink on its opposite sides, and if the direction of the current applied across it is reversed, the heat source and heat sink switch sides. This feature makes a Peltier device 62 ideal for systems which require selective heating and cooling.

The Peltier device 62 is thus used to change the temperature of the reservoir fluid 52, i.e., heating or cooling the fluid 52 in order to heat or cool the zones 11,12,13, according to the position of a switch that is under one of various forms of control to be discussed in more detail below. In response to a need for heating or cooling a zone, fluid is drawn from the reservoir 60 and directed through the conduit circuits 40 to effectuate the necessary temperature change. The application of energy necessary to move the fluid 52 through the conduit circuits 40 is effectuated in a variety of possible ways, such as through the use of a multichannel pump, multiple single-outlet pumps, or a single-outlet pump in combination with one or more valves.

Control 70, which is wireless as shown but which is alternatively provided with a wired connection to the heating/cooling apparatus 50, is used to set the target temperatures for each of the zones. Control 70 in combination with temperature probes 80 will enable the system to maintain a target temperature in each zone 11,12,13 through the selective application of heated or cooled fluid to the conduit circuits 40 in each zone. Using the control 70, a user will select an independent target temperature for each zone 11,12,13. Temperature probes 80 in each zone will provide temperature data for that zone to the heating/cooling apparatus 50, which will by comparison of the target temperature set using the control 70 and the actual measured temperature determine whether to heat or cool the fluid 52 and determine to which conduit circuit or circuits 40 the heated or cooled fluid 52 should be distributed in order to make the actual temperature match the target temperature.

In a preferred embodiment, the topper 30 or mattress 23 (for embedded designs) will include padding 90 between the conduit circuits 40 and the resting surface, in order to improve the comfort of a user who lies upon the system and to prevent the concentrated heat or cold of the conduit circuits 40 from being applied directly or semi-directly to the user's body. Instead, the conduit circuits 40 will heat or cool the padding 90, which will provide more gentle temperature modulation for the user's body.

Figure 2A:
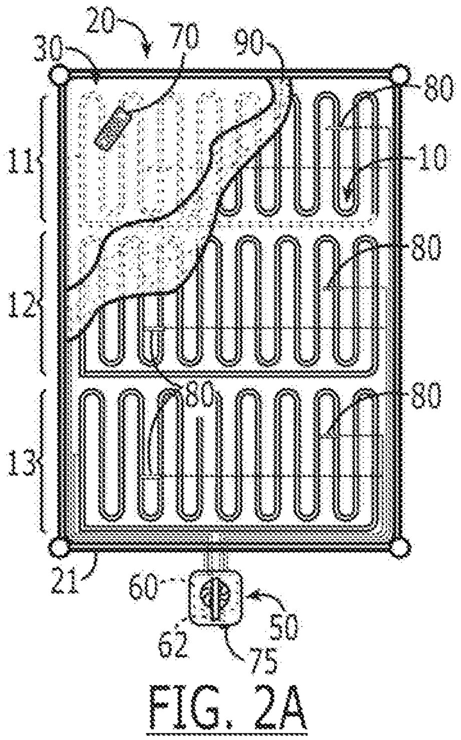
FIG. 2A is a plan view of a preferred embodiment as in FIG. 1.
Figure 2B:
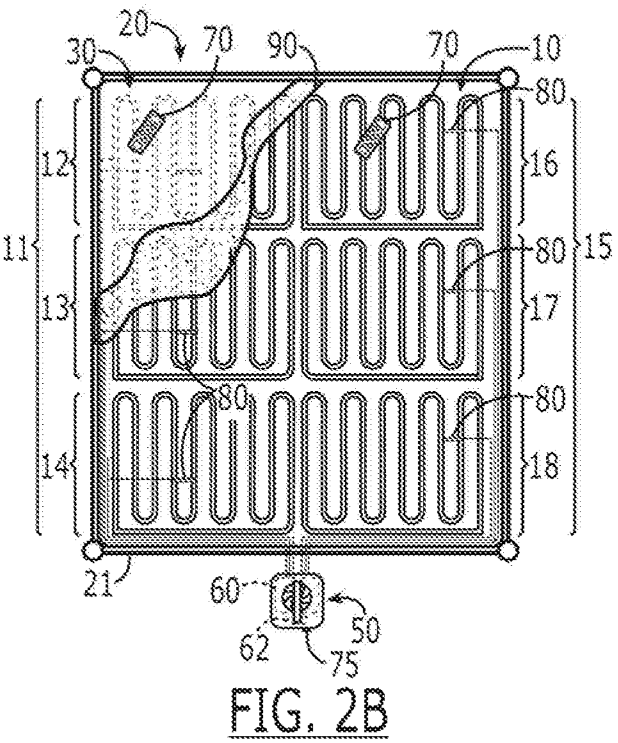
FIG. 2B is a plan view of an alternative embodiment.
Figure 2C:
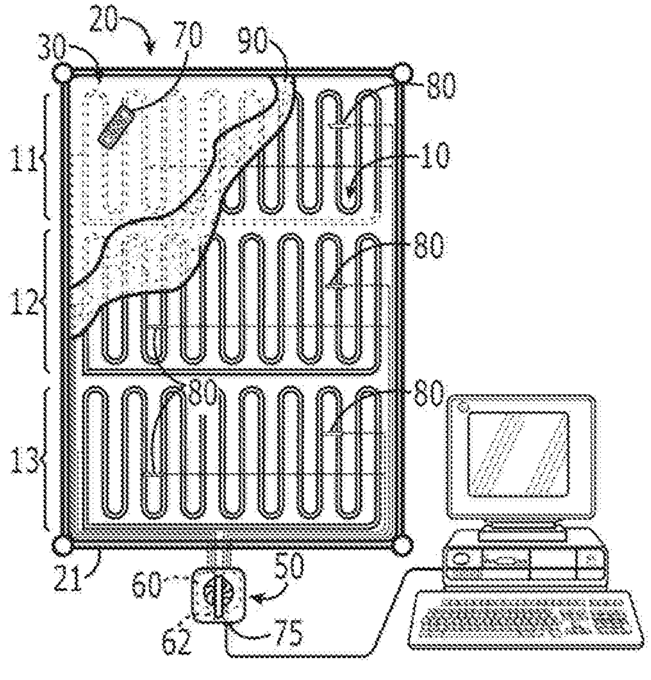
FIG. 2C is a plan view of another alternative embodiment.

Referring now to FIGS. 2A-2C, various embodiments of the present invention are illustrated in plan view for comparative purposes, in order to demonstrate the various zone arrangements that are serviced according to the present invention. In FIG. 2A, the view is as in FIG. 1, in which three zones 11,12,13, corresponding generally to the head, body and legs, and feet, respectively, of the subject utilizing the system. Although only three zones are shown, it is equally possible to have two, four, or more zones of control. In FIG. 2B, another preferred embodiment is shown in which two sides of a two-person bed, such as a full, queen, or king size bed, are provided with two separate zones 11,15. In one embodiment, these zones are divided into zones or subzones 12,13,14 and 16,17,18 as in FIG. 2A. In the arrangement shown in FIG. 2B, two separate controls are provided in order to enable each user to set his or her own preferences. In this embodiment, despite the presence of two separate controls, a single heating/cooling apparatus 50 are utilized to control the temperature of reservoir fluid 52.

In FIG. 2C, another alternative embodiment is shown in which, again, there are three zones 11,12,13. For purposes of this embodiment, the arrangement could as easily encompass only a single zone 11, because the significance of this embodiment is in the control system 71. Instead of a wireless handheld control, the heating/cooling apparatus 50 is conveniently connected via a port 75 such as a USB, serial, or other port to computer 71. Computer 71 has been programmed to control the operation of the system 10 in accordance with a schedule of target temperatures selected to correlate with sleep cycles of the user. Such an arrangement promotes deeper, more restful sleep by altering body temperature at critical points. This arrangement will be discussed in greater detail below.

Figure 3:
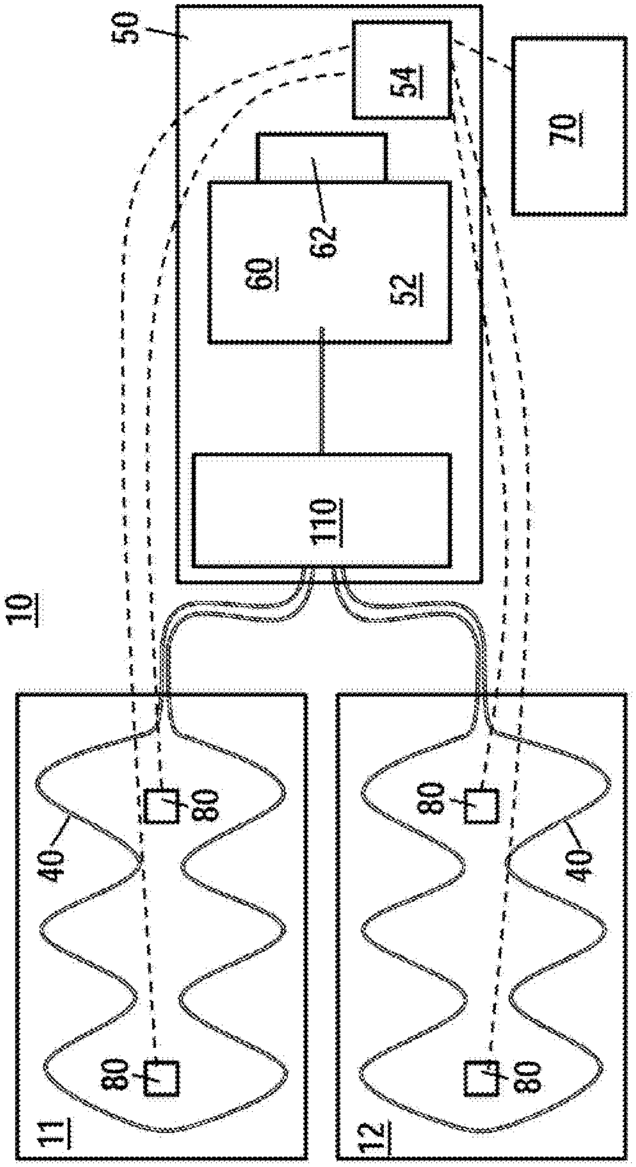
FIG. 3 is a schematic view of a preferred embodiment of the present invention.

Referring now to FIG. 3, a preferred embodiment of the present invention is shown in a schematic view to illustrate in greater and more convenient detail the various components of the system. Zones 11,12 are provided with conduit circuits 40 for directing a heated or cooled fluid 52 therethrough. The fluid 52 is held in a reservoir 60 and heated or cooled using a Peltier device 62 or any other suitable means. Temperature probes 80 are located within the zones 11,12 and are connected to the control unit 50, which contains computing apparatus 54, (e.g., a microprocessor, a circuit board containing logic circuits, or any other suitable arrangement), the construction of which is well known in the art to which the present invention relates. Computing apparatus 54 is attached to a user interface 70, which is, in various embodiments be a handheld wireless or wired remote control, a personal computer, or other suitable input device. The user interface 70 is used to set the parameters of operation of the control unit 50.

The computing apparatus 54 is designed or programmed to operate the Peltier device 62 and more particularly to apply direct current of a given polarity across the Peltier device 62, in order to heat or cool the fluid 52 in the reservoir 60, as needed. The computing apparatus 54 is also designed or programmed to operate a pump and valve system 110, various embodiments of which are illustrated in schematic detail in FIGS. 4A-4C. By manipulating the pump and valve system 110, the computing apparatus controls the manner in which heated or cooled fluid 52 is driven through the conduit circuits 40 to heat or cool the zones 11,12.

For example, in the beginning of use, a user, using the user interface 70, calls for a target temperature of 60° F. in zone 11 and a target temperature of 70° F. in zone 12. The temperature probes 80 register the temperature of zone 11 as 75° F. in zone 11 and 74° F. in zone 12. The computing apparatus 54 therefore activates the Peltier device 62 in cooling mode, to chill the reservoir fluid below 60° F. The computing apparatus 54 also activates the pump and valve system 110, causing fluid 52 to flow through both conduit circuits 40, back and forth across the two zones 11,12, and returning to the reservoir 60. Over time, the actual temperature as measured by the temperature probes 80 decreases. At a given point, the temperature in zone 12 is measured at the target of 70° F. The computing apparatus 54 then controls the pump and valve system 110 to cause cooled fluid to stop flowing through zone 12, even as cooled fluid continues to flow through zone 11. Eventually, the temperature in zone 11 will also reach the target. However, because the temperature in zone 12 rises, the pump and valve system are adjusted one or more times during the process to maintain the temperature in zone 12 at the target, while the temperature in zone 11 continues to drop to the lower target temperature.

Those skilled in the art will recognize that programmatic control of the target temperatures over time, such as over the course of a night's sleep, will be possible if a computer 70 is employed as the user interface. Because the target temperatures is able to be set at any time, those target temperatures are able to be manipulated through the sleeping period in order to match user preferences or a program to correlate with user sleep cycles to produce a deeper, more restful sleep.

In the system heretofore described, the details of the pump and valve system 110 have been largely omitted. A system 110 according to the present invention will permit the elimination of duplicate parts, typically the most expensive parts of such an apparatus, such as the heating/cooling device 62 and the control apparatus 54, through the creative use of one or more pumps and valves and principles of time and flow division.

Figure 4B:
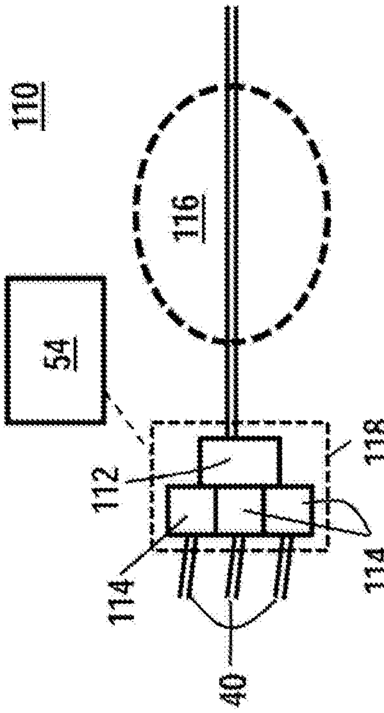
FIG. 4B illustrates a second preferred embodiment of a pump and valve system.
Figure 4A:
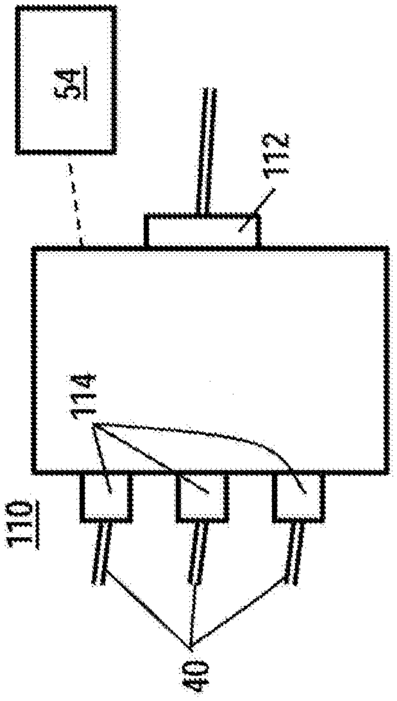
FIG. 4A illustrates a first preferred embodiment of a pump and valve system.

Referring now to FIG. 4A, a first preferred embodiment of a pump and valve system 110 is a multichannel pump 110 which includes an inlet 112 which serves as a conduit for fluid from the reservoir 60 and a number of outlets 114, each of which is independently controlled to permit fluid 52 to flow or not to flow into a respective conduit circuit 40 associated with a zone 11,12,13. In this arrangement, the multichannel pump 110 applies pressure to the fluid 52 and selectively opens each outlet 114 according to instructions from a control apparatus 54 (see FIG. 3) to allow fluid to flow to the associated zone 11,12,13, thus cooling or heating the zone 11,12,13 in accordance with a differential between the target temperature and the actual temperature for that zone. Because the outlets 114 are individually controlled, the flow of fluid 52 is divided among one or more outlets 114 at the same time. Alternatively, this arrangement is used in a time-division arrangement, whereby the full flow of fluid 52 is directed serially through the respective outlets 114 in order to achieve the same effect.

Referring now to FIG. 4B, a second preferred embodiment of a pump and valve system 110 is illustrated. This arrangement is simpler in scope than the embodiment shown in FIG. 4A, in that the pump 116 is physically separated from the valve 118. The pump 116 is activated to provide fluid pressure, and the valve 118 is under the control of the control apparatus 54, alternately directing the fluid from inlet 112 through outlets 114,114,114 serially in a time-division arrangement.

Figure 4C:
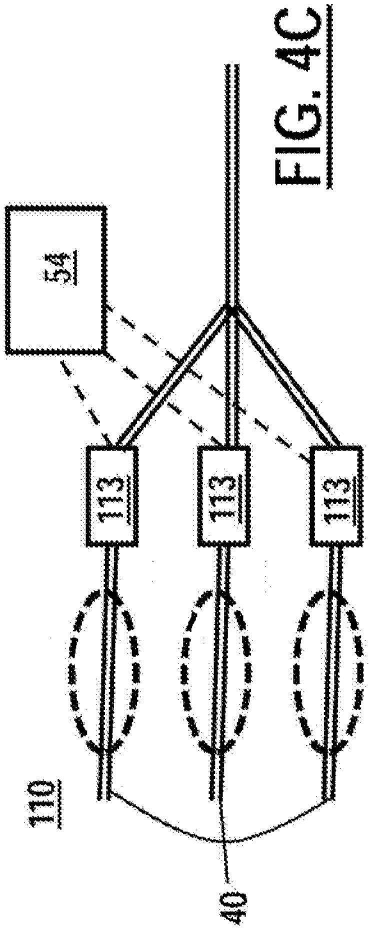
FIG. 4C illustrates a third preferred embodiment of a pump and valve system.

Referring now to FIG. 4C, another preferred embodiment of a pump and valve system 110 is illustrated. In this arrangement, each zone 11,12,13 is provided with its own pump 110 and valve 113, which independently operates to provide fluid pressure through the associated conduit circuit 40. This arrangement results in some duplication of components, but is useful under certain circumstances in which there is a need to provide full flow of fluid 52 through each zone 11,12,13 at all times.

The principle of time division, as applied in the present invention, relies upon the tendency of the temperature of a given zone to remain fairly steady over time. That is, heating or cooling often need only be applied for a few minutes per hour to keep the temperature of a given zone at the target, while another zone requires fairly constant heating or cooling to maintain its target temperature. The control apparatus 54 thus divides the time among the zones in an efficient manner that keeps each zone as near to its target temperature as possible over the greatest period of time.

Figure 5A:
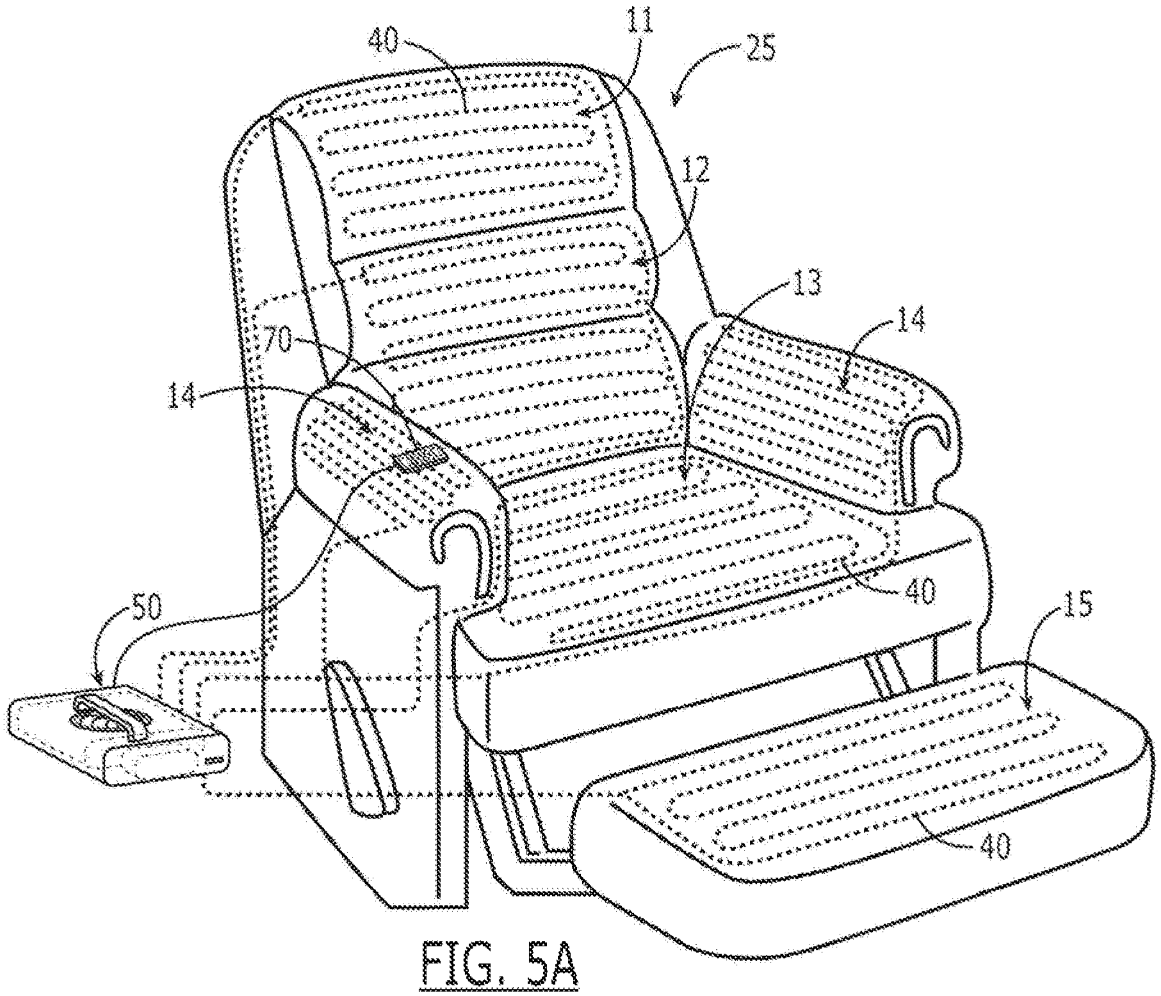
FIG. 5A illustrates a recliner chair with multiple independent temperature zones.

Although the arrangement illustrated in FIGS. 1 and 2A-2C is in a mattress-type arrangement, such as a mattress 23 or a topper 30, it is equally possible to apply the concepts of the invention to other contexts. For example, as in FIG. 5A, a recliner chair 25 is shown. In much the same manner as is done with the mattress 23 or topper 30 arrangements, the recliner chair 25 is provided with a number of zones 11,12,13,14, 15, each of which has an associated conduit circuit 40 under independent temperature control by a control apparatus 50 as directed by a user interface 70. The operation of such a system is identical to that described above.

Figure 5B:
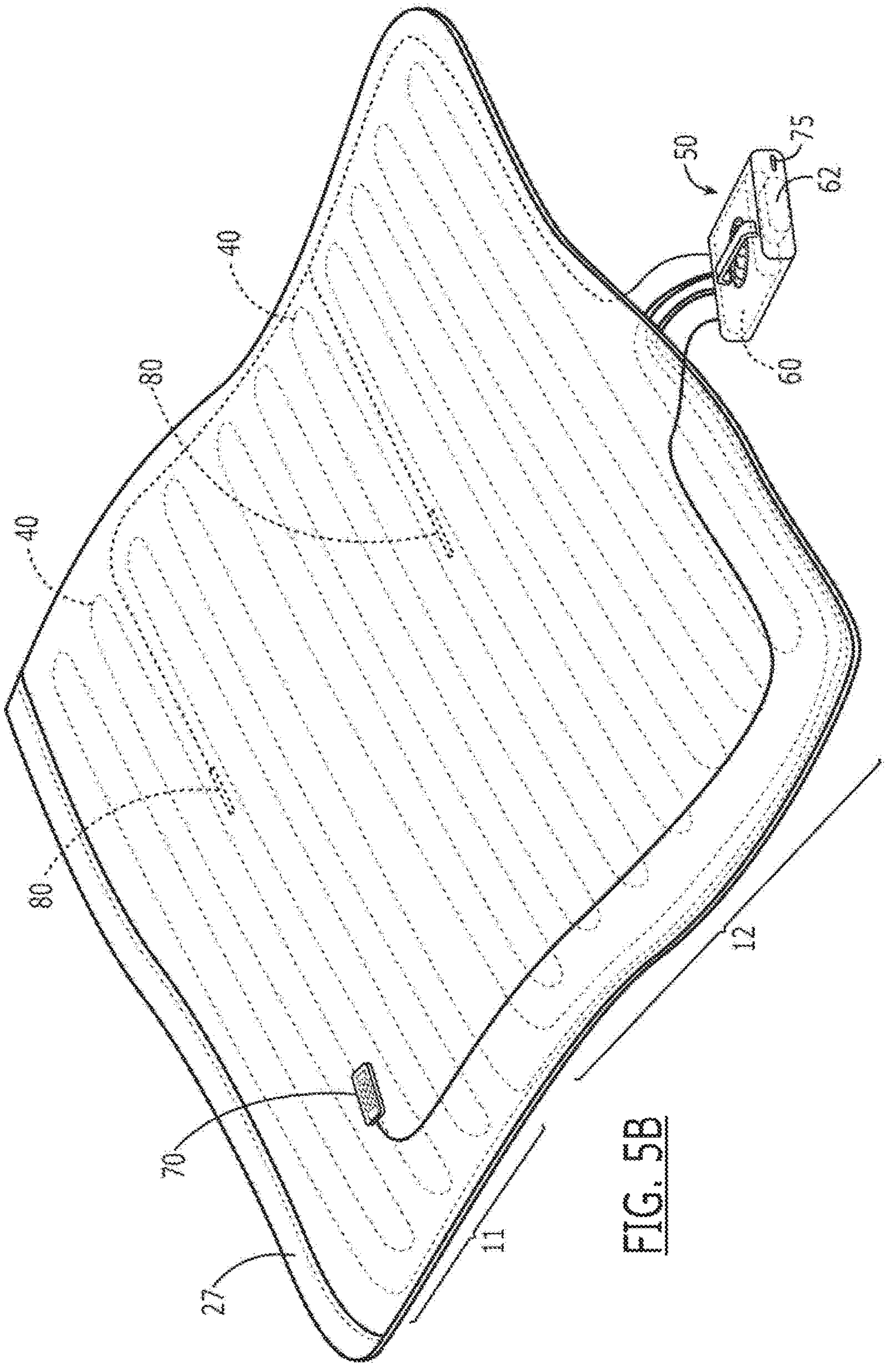
FIG. 5B illustrates a multi-zone heating/cooling system contained within a blanket.

Also, as is illustrated in FIG. 5B, the concepts of the present invention are not limited to support furniture such as mattresses, chairs, and the like. A multi-zone heating/cooling system is contained within a blanket 27, for example, which is conveniently placed over or under the user to provide heating or cooling within given zones 11,12. In such an arrangement, the use of flexible tubing for the conduit circuits 40 is important to promote the ability of the blanket 27 to conform to the user's body.

Referring now to the drawings generally, a temperature modulation system 10 for a bed 20 includes a fluid 52 for moderating temperature change at a surface 24 of the bed 20, a number of conduit circuits 40 for directing the fluid 52 through respective zones 11,12,13, and a thermoelectric device 62 for modulating the temperature of the fluid 52. The system 10 also includes a pump 110 for pumping the fluid 52 through the conduit circuits 40. Each of the conduit circuits 40 selectively, by use of a pump and valve system 110, and independently directs fluid 52 through its respective zone 11,12,13 to achieve a temperature of the mattress 23 of the bed 20 that is independent of the temperature of the bed 20 outside the zone 11,12,13.

In one embodiment, the fluid 52 is a liquid such as water, or it is a gas, such as air, depending upon the requirements of the system. In one embodiment, the pump and valve system 110 is a multichannel pump, or it is a single pump with a multi-outlet valve, or it includes several pumps and valves. The particular type of pump and valve system chosen is tied to the nature of the fluid 52. The valves 113 are mechanically or electrically operated, under the control of a control system 54 that selectively opens and closes the valves 113 to permit fluid 52 to flow therethrough.

The system 10 is designed to operate on a flow-division or a time-division basis, the latter being characterized by permitting the full flow of fluid 52 to be directed through a single conduit circuit 40 for a given period of time, one at a time serially, to achieve the target temperature in each zone 11,12,13.

In order that the system 10 is able to control each zone individually, temperature sensing probes 80 are provided, which give feedback to the control system 54 concerning the actual temperature of the given zone 11,12,13.

Through the use of a Peltier thermoelectric device 62, it is possible to provide heating and cooling using the same unit, thereby increasing the utility of the present invention in comparison to systems that provide only heating or only cooling.

In the context of bed use, the system 10 is able to be integrated into the mattress 23, or it is able to be a separate article such as a mattress topper 30.

The system 10 conveniently receives user input through a user interface 70 such as a remote control, wired or wireless. Alternatively, the system is provided with a port 75 to connect it to a computer 71 such as a personal computer, in order to enable programmatic control of the system over time.

More generally, the present invention includes a multi-zone temperature modulation system 10 for providing selective temperature change to a living subject. The system includes a first zone 11 that includes a first conduit circuit 40 for directing a first fluid 52 therethrough, in order to bring the first zone temperature to a target temperature for the first zone. The system also includes a second zone 12 of similar but independent construction, and the second zone 12 has a target temperature that is independent of the target temperature of the first zone 11. As above, this embodiment uses a thermoelectric device for selectively modulating the temperature of the first and second fluids, as well as at least one pump for pumping the fluids through the conduit circuits. Similar features of this embodiment are provided as above.

This arrangement is applicable to a wide variety of contexts, including beds, mattress toppers, chairs, other support furniture, and blankets.

Yet another embodiment involves the use of at least one zone and the selective manipulation of the temperature over a period of time. In such an embodiment, a temperature modulation system 10 provides selective temperature change to a living subject and includes a fluid 52 for moderating temperature change within a selected zone 11 adjacent the subject. At least one conduit circuit directs the fluid 52 through the zone 11 to control temperature of the zone 11 according to a selected target temperature. The structure is largely as above, but the control system 54 (either on its own or under the programmatic control of an attached computer 71) is programmed to control the zone temperature according to a schedule of target temperatures over a selected period of time.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by any claims appended hereto and the equivalents thereof.

The invention claimed is:

1. A system for adjusting a temperature of a liquid comprising:

a set of control units that includes a first control unit and a second control unit, the system further including a set of pumps including a first pump and a second pump, each pump having at least one corresponding inlet, and at least one corresponding outlet;

a first reservoir and a second reservoir, each containing a portion of the liquid; and at least one device operable to adjust the temperature of the liquid in at least one of the first reservoir or the second reservoir;

wherein at least one pump of the set of pumps is operable to pump the liquid through the corresponding at least one outlet and into a first independent temperature zone;

wherein at least one pump of the set of pumps is operable to pump the liquid through the corresponding at least one outlet and into a second independent temperature zone;

wherein each pump of the set of pumps is operable to receive the liquid through the corresponding at least one inlet from at least one of the first independent temperature zone and the second independent temperature zone; and wherein the first independent temperature zone and the second independent temperature zone are embedded in a mattress or a mattress topper.

2. The system of claim 1, wherein the set of control units is operable to wirelessly receive a first target temperature for the first independent temperature zone and a second target temperature for the second independent temperature zone.

3. The system of claim 1, wherein the set of control units is operable to cause the at least one device to heat or cool the liquid based on a first target temperature of the first independent temperature zone or a second target temperature of the second independent temperature zone.

4. The system of claim 1, wherein the set of control units is operable to control distribution of the liquid to the first independent temperature zone or the second independent temperature zone based on a first target temperature of the first independent temperature zone or a second target temperature of the second independent temperature zone or stop distribution of the liquid to the first independent temperature zone or the second independent temperature zone based on the first target temperature of the first independent temperature zone or the second target temperature of the second independent temperature zone.

5. The system of claim 1, wherein the set of control units is operable to control distribution of the liquid to the first independent temperature zone through the at least one outlet and the second independent temperature zone through the at least one outlet simultaneously based on scheduled target temperatures correlating to a sleep cycle of at least one user.

6. The system of claim 1, wherein the set of control units is operable to control distribution of the liquid to the first independent temperature zone and the second independent temperature zone through the at least one outlet sequentially based on scheduled target temperatures correlating to a sleep cycle of at least one user.

7. The system of claim 1, wherein the at least one outlet is connected to a first end of a first circuit, wherein the first independent temperature zone includes a portion of the first circuit, wherein the at least one outlet is connected to a first end of a second circuit, and wherein the second independent temperature zone includes a portion of the second circuit.

8. The system of claim 1:

wherein the first control unit includes a first inlet, a first outlet, the first pump, and the first reservoir;

wherein the second control unit includes a second inlet, a second outlet, the second pump, and the second reservoir;

wherein the at least one device includes a first device operable to adjust the temperature of the liquid in the first reservoir and a second device operable to adjust the temperature of the liquid in the second reservoir;

wherein the first pump is operable to receive the liquid through the first inlet from the first independent temperature zone and pump the liquid from the first reservoir through the first outlet and into the first independent temperature zone; and wherein the second pump is operable to receive the liquid through the second inlet from the second independent temperature zone and pump the liquid from the second reservoir through the second outlet and into the second independent temperature zone.

9. A system for adjusting a temperature of a liquid comprising:

set of control units that includes:

a first control unit having a first pump fluidly coupled to a first reservoir, a first outlet, and a first inlet, and further having a first temperature-control device; and a second control unit having a second pump fluidly coupled to a second reservoir, a second outlet, and a second inlet, and further having a second temperature-control device;

wherein the first temperature-control device and the second temperature-control device is each operable to adjust the temperature of the liquid contained in the first reservoir and second reservoir, respectively, based on respective schedules of target temperatures over corresponding a selected periods of time;

wherein the first outlet is fluidly coupled to the first a first end of a first conduit circuit, wherein at least a portion of the first conduit circuit is included in a first independent temperature zone;

wherein the second outlet is fluidly coupled to a first end of a second conduit circuit, wherein at least a portion of the second conduit circuit is included in a second independent temperature zone;

wherein the first pump is operable to pump a first portion of the liquid through the first outlet and into the first independent temperature zone, and to receive the first portion of the liquid from the first independent temperature zone via the first inlet; and wherein the second at least one pump is operable to pump a second portion of the liquid through the second outlet and into the second independent temperature zone, and to receive the second portion of the liquid from the second independent temperature zone via the second inlet.

10. The system of claim 9, wherein the first independent temperature zone and the second independent temperature zone are embedded in a mattress or a mattress topper.

11. The system of claim 9, wherein the schedules of target temperatures correlate to a sleep cycle of at least one user.

12. The system of claim 9, wherein the first control unit is operable to receive a first actual temperature of the first independent temperature zone and the second control unit is operative to receive a second actual temperature of the second independent temperature zone, and wherein the first pump is operable to control or to stop distribution of the liquid to the first independent temperature zone based on comparison of the first actual temperature of the first independent temperature zone to a first target temperature of the first independent temperature zone, and the second pump is operable to control or to stop distribution of the liquid to the second independent temperature zone based on a comparison of the second actual temperature of the second independent temperature zone to a second target temperature of the second independent temperature zone.

13. The system of claim 9, wherein the liquid is water, and wherein the first independent temperature zone and the second independent temperature zone are embedded in a mattress or a mattress topper.

14. The system of claim 9, wherein the first control unit is operable to wirelessly receive a first target temperature for the first independent temperature zone and the second control unit is operable to wirelessly receive a second target temperature for the second independent temperature zone.

15. A system for adjusting a temperature of a liquid comprising:

a first control unit and a second control unit;

the first control unit, including:

a first pump including at least one first outlet, and at least one first inlet;

a first reservoir operable to contain a first portion of the liquid; and a first temperature sensor;

wherein the first control unit is operable to heat and cool the first portion of the liquid in the at least one reservoir;

the second control unit, including:

a second pump including at least one second outlet, and at least one second inlet;

a second reservoir operable to contain a second portion of the liquid; and a second temperature sensor;

wherein the second control unit is operable to heat and cool the second portion of the liquid in the at least one reservoir;

wherein the first outlet is fluidly coupled to the first independent temperature zone and the at least one second outlet is fluidly coupled to the second independent temperature zone;

wherein the first pump is operable to pump the liquid through the first outlet and into the first independent temperature zone, and the second pump is operable to pump the liquid through the at least one second outlet into the second independent temperature zone;

wherein the at least one first inlet is fluidly coupled to the first independent temperature zone, and wherein the at least one second inlet is fluidly coupled to the second independent temperature zone;

wherein the first control unit is operable to receive data from the first temperature sensor corresponding to the temperature of the first independent temperature zone and the second control unit is operable to receive data from the second temperature sensor corresponding to the second independent temperature zone; and wherein the heating or cooling of the liquid in the first and the second reservoirs is modified based on the data from the at least one temperature sensor.

16. The system of claim 15, wherein the first and the second control unit is each operable to receive target temperatures from at least one computing device.

17. The system of claim 15, wherein the liquid is water.

18. The system of claim 15, wherein the first and the second control unit is each operable to heat and cool the liquid in the corresponding reservoir using at least one thermoelectric device.

19. The system of claim 15, wherein the first independent temperature zone and the second independent temperature zone are embedded in a mattress or a mattress topper.

* * * * *